3,454,520
ETHYL-PROPYLENE POLYMER STRIPPABLE COATING COMPOSITIONS
William W. West, El Cerrito, and Robert O. Bolt, San Rafael, Calif., assignors to Chevron Research Company, San Francisco, Calif., a corporation of Delaware
No Drawing. Continuation-in-part of application Ser. No. 602,467, Dec. 19, 1966. This application Sept. 19, 1967, Ser. No. 668,925
Int. Cl. C09d 3/60, 5/20
U.S. Cl. 260—33.6                    10 Claims

ABSTRACT OF THE DISCLOSURE

Ethylene-propylene copolymers having from 20 to 30 mole percent ethylene, and, respectively 80 to 70 mole percent, propylene prepared by Ziegler catalysts, having viscosities at 210° F. of 40 to 300 SUS (2.8 weight percent in 130 neutral oil), find use as basic material in strippable coatings.

Cross-references to related applications

This application is a continuation-in-part of application Ser. No. 602,467, filed Dec. 19, 1966.

Background of the invention

Field of the invention.—There is a continuing need to provide an economical means for protecting large, bulky materials from deterioration when stored outdoors. Protective means are also useful in shipping and storage to prevent damage because of rough handling or other mechanical treatment. Therefore, there has been a persistent search to find materials which could be conveniently and economically coated onto a bulky base material, and, as desired, removed without damage to the base material. The protective coating must withstand the expected treatment to the base material, retaining its strippability during this time, as well as its protective character.

Summary of the invention

High molecular weight copolymers of ethylene and propylene having from 70 to 80% propylene and respectively 20 to 30% ethylene, usually in combination with minor amounts of additives, are applied in solution to base materials to provide a tough, moderately adhering coating, which may be readily removed without damage to the base material, but is retained on the base material during normal storage and mechanical abuse.

The coatings are generally applied so as to provide a thickness of at least about 0.001″ and to be substantially continuous, so as to avoid spot deterioration of the base material.

Description of the preferred embodiments

Polymers.—The polymers which find use are copolymers of ethylene and propylene of a molecular weight of at least about 100,000, predominantly atactic, and having from 70 to 80 mole percent propylene and from 20 to 30 mole percent ethylene. The presence of small amounts of other monomers is permissible, but not to exceed 10 mole percent, more usually not to exceed 2 mole percent.

By predominantly atactic is meant soluble in refluxing heptane. At least 75 weight percent of the polymer will be soluble in refluxing heptane and usually at least 90 weight percent will be soluble in refluxing heptane. In determining the solubility, 10 parts of heptane will be used per part of polymer. Particularly preferred compositions are those which have at least 90 weight percent dissolved in heptane at 50° C. or below.

The molecular weight of the polymer will generally be at least 100,000 and not exceed 2,000,000. For the most part, the molecular weight will be in the range from about 250,000 to 1,000,000. The viscosity of the polymer reported in Saybolt Universal Seconds at 210° F. and determined at a concentration of 2.8 weight percent of polymer in 100 g. of 130 neutral oil will range from about 40 to 300, more usually about 60 to 175 SUS.

The copolymers of this invention are readily prepared using "Ziegler" catalysts which do not provide high stereospecificity. A conventient catalyst is afforded by aluminum triisobutyl and titanium trichloride. The solvents used may be a variety of inert solvents, particularly inert hydrocarbon solvents, both aliphatic and aromatic. It is particularly advantageous to prepare the polymer in the solvent chosen for the final application, e.g., a mixture of hydrocarbons in the range of heptane through nonane. The temperature for the reaction will generally be above room temperature, usually in the range of about 30° to 100° C. The pressure will generally be above atmospheric pressure, generally not exceeding 50 p.s.i.g. Control of the molecular weight of the polymer is most readily achieved by the use of a hyrogen pressure, when carrying out the polymerization. The methods for preparing these polymers are well known in the art and do not require extensive exemplification here.

Coating compositions.—As already indicated, the polymers which find use in this invention are soluble in refluxing heptane. The polymers may be dissolved in aromatic hydrocarbon solvents, as well as aliphatic hydrocarbon solvents other than heptane. Illustrative solvents are benzene, toluene, heptane, hexane, octane, nonane, cyclohexane, etc. Usually, for convenience, mixed solvents will be used rather than a pure solvent. The solvents are not restricted to hydrocarbons, but also include halohydrocarbons, ethers, etc.

The solvents generally have boiling points in the range of about 50° to 150° C. For the most part, aliphatic hydrocarbons are preferred of from about 6 to 9 carbon atoms, because of their availability and volatility. These solvents find use when applying the polymers of this invention to the base material.

Various additives may be used to further enhance properties which the compositions of this invention already have, e.g., adherence, strippability and weatherability, or to provide new protective properties to the film, e.g., fungicides, rust inhibitors, etc.

Additives which find particular use are those which protect the polymer from oxidative degradation. These additives include antioxidants and ultraviolet light absorbers. Illustrative antioxidants are substituted phenols, such as di-tert.-butyl-p-cresol, thio(bis-phenols), etc., aromatic amines, organic phosphites, combinations of phenols and sulfur containing compounds, dialkyl selenides, etc. Illustrative ultraviolet light absorbers are benzotriazole, hydroxyphenylbenzotriazole, hydroxybenzophenone, etc. These additives which protect against oxidative degradation will generally be present in from 0.01 to 2 weight percent of polymer.

Other additives are also included in the coating compositions s preferred embodiments. Such additives include fillers, such as talc, graphite, carbon black, asphaltenes, gilsonite, etc. Of particular advantage are graphite and carbon black, which also afford some ultraviolet protection. These additives will generally be present in from about 0.1 to 5 weight percent of polymer.

Other additives to enhance strippability include soaps, such as aluminum stearate, etc.

The total amount of the additives will usually be from about 0.1 to 10 weight percent of the polymer, more usually 1 to 5 weight percent of the polymer.

Plasticizers also find use, particularly hydrocarbons of lubricating viscosity. Preferred oils are those which are highly refined, e.g., white oil, turbine oil base-light, etc.

Generally, the plasticizer will be present in from 1 to 30, preferably 5 to 25 weight percent of polymer.

The compositions of this invention are used as solutions or slurry-solutions in various solvents. Depending on the temperature, the concentration will be in the range of 5 to 50 weight percent, more usually in the range of about 10 to 30 weight percent. The solutions or slurry-solutions may be applied in a variety of ways, e.g., dip coating, spraying, roller coating, etc. Depending on the method of application, the temperature of application will vary from about 20° to 80° C. Any method which provides a relatively uniform coat on the base material or object may be employed. The use of the polymers of this invention, particularly at elevated temperatures, e.g., 50° C., provides relatively homogeneous solutions of relatively low viscosity permitting the variety of methods of applying the polymers which have been described above.

The different methods of applying the coatings will affect the physical properties of the coating, e.g., adherence to the coated surface. To that extent, for some uses one method of applying will be preferred over another. It is found generally that the airless spray method (spray pattern formed by flow through orifice at 500-2000 p.s.i. pressure) at an elevated temperature, e.g., 50° C., provides the best all around means of coating lumber stacks, e.g., stacks of plywood. Roller coating is useful for large areas, e.g., sheets of plywood. Dipping is preferred for odd shapes, including paper rolls, etc.

base in small bits. The coatings of this invention are cleanly and easily removed from their base materials, coming off in large, continuous sheets.

EXAMPLES

The following examples are offered by way of illustration and not by way of limitation.

EXAMPLE I

Into a reaction vessel was introduced 7 gal. of 200 thinner (mixed aliphatic solvent, boiling range 166° to 220° F.), and the vessel heated to 165° to 170° F. To the solvent was then added 25.3 g. of titanium trichloride (AA) and 31 g. of triisobutyl aluminum. The vessel was pressurized to 5 p.s.i. with propylene and then the pressure raised to 7 p.s.i. with a mixture of ethylene and propylene in a 20 to 80 mole ratio. The polymerization was continued, maintaining the pressure with the 20:80 ethylene:propylene mixture. Over a period of 1 hr. and 40 minutes, the temperature was slowly allowed to rise to 175° F. and the pressure to 25 p.s.i. The vessel was then charged with nitrogen and the solution filtered hot through cheesecloth. 15,700 g. of solution was obtained having 9.4% solids (1,480 g.).

A number of polymerization were carried out as described above, varying the ratio of ethylene and propylene. The following table indicates the results:

TABLE I

| Ex. | Catalyst | | Temp., °F. | Time, min. | Solvent [2] | E/P [4] mol ratio | Product, g. | Properties vis., SUS [5] |
|---|---|---|---|---|---|---|---|---|
| | TiCl$_3$, g. | TiBAl[1], g. | | | | | | |
| II | 24.5 | 30 | 170 | 90 | 200 thinner [3] | 25/75 | 1,330 | 115.0 |
| III | 24.2 | 15 | 170 | 75 | do [3] | 20/80 | 1,480 | |
| IV | 25.1 | 8 | 170 | 125 | do [3] | 20/80 | 885 | 217.7 |
| V | 26.6 | 15 | 170 | 110 | do [3] | 25/75 | 1,380 | |
| VI | 27.8 | 16 | 170 | 105 | do [3] | 20/80 | 1,530 | |
| VII | 25.0 | 30 | 155 | 1,210 | do [3] | 30/70 | 1,340 | 157.7 |
| VIII | 26.3 | 32 | 170 | 110 | do [3] | 30/70 | 1,340 | |

[1] Triisobutyl aluminum.
[2] Seven gallons of solvent was used in each example.
[3] Aliphatic solvent (~5% aromatics); boiling range 166°-220° F.
[4] Ethylene/propylene.
[5] 2.8% (wt.) polymer in 130 neutral oil; 210° F.

The coating application temperature affects the porosity of the coating, particularly as measured by water transmission. A cold application gives greater porosity than coating at elevated temperatures.

It is frequently advantageous to dry the coating at elevated temperatures. Depending on the solvent used, temperatures of about 50° to 80° C. will suffice over a period of 1 to 25 minutes; usually, 5 to 15 minutes is preferred. Warm air, heating lamp or other convenient means may be used to achieve the desired temperature. Usually, evaporation of only 85 to 95 weight percent of the solvent is required to obtain an acceptable nontacky surface.

The films which are applied to the base material or object will generally be of at least 0.001″ thickness and generally not more than 0.050″ thickness. More usually, the thickness of the film will be in the range of about 0.005 to 0.025″ thickness. The desired thickness will depend on the particular material used, the method of application, etc.

The films formed by this invention adhere to the various base materials sufficiently to provide the protection required from abrasion, water, etc. However, the films do not adhere so strongly that they deface the base material, such as wood or paper, when they are stripped from it. Therefore, the polymers of this invention adhere strongly enough so that they are not readily removed by accidental physical abuse, but are readily removed without damage to the base material when stripped.

The cover must also be strong enough so the stripping is convenient. That is, when stripping, the coating must come off in large sheets and not crumble or stick to the As already indicated, the coatings of this invention may be applied to protect a variety of materials: paper, wood, metals, e.g., aluminum and steel, glass, plastics, plasters, etc. It is with the soft absorbent surfaces of paper and wood that the coatings of this invention are particularly useful. It is these materials for which the properties of coatings are most stringent. The fine line between adhering to the surface without removing paper or wood when stripped sets strict limitations on the permitted coating materials. The materials of this invention have the proper balance of adherence, strength and strippability to provide excellent protection without damage to the protected base. The following data demonstrate the effectiveness of the coatings of this invention with the particularly sensitive base material wood.

The samples which are coated wooden plaques were formed by casting. A solution of the exemplary polymer is heated to about 55° to 60° C., and poured onto a level wood surface and allowed to cool. The solvent used was an essentially aliphatic solvent, having a boiling range of 75° to 105° C. As the plaque cooled, the solvent evaporated, leaving a continuous coating on the wooden surface. The coatings were found to be in the range of from 10 to 15 mil thickness. The test is particularly severe, since no additives are used to enhance the properties of the coating.

The coatings are evaluated as to ease of stripping from a wooden surface, taking into consideration the following properties: strippability, cleanliness, and film strength. Strippability or adhesiveness indicates the adherence to the wood and the ease with which the film strips from the wood. Cleanliness refers to small pieces adhering to the surface after removal of the coating. Film strength indicates the degree to which the film held together when it was stripped. A scale of 0 to 10 is used, 10 being excellent. Also reported is a description of the wood surface appearance after stripping (cleanliness).

In addition, the tensile properties of the polymers are reported as determined on an Instron apparatus. Strips, approximately ½" x 6" were peeled off the wooden plaques. The conditions for this test were that the jaws were set 1" apart and the rate of separation of the jaws was 20"/min.

The following table indicates the results:

TABLE II

| Example | Instron ratings | | Strippability properties | |
|---|---|---|---|---|
| | Break strength, p.s.i. | Elongation, percent | Ease of stripping | Wood surface appearance after stripping |
| I | 595 | 525 | | |
| I, III, IV, VI [1] | | | 8.8 | Clean. |
| II | 790 | 615 | | |
| II, V [1] | | | 9.0 | Do. |
| VIII | 690 | 775 | | |
| VII, VIII [1] | | | 8.5 | Do.[2] |

[1] Results are reported for average of all the compositions.
[2] Occasional tendency towards very slight stickiness.

It is evident from the above table that the compositions of this invention provide good adherent coatings which are readily stripped from the base material without injuring the material coated. The compositions may be applied by a variety of means to provide the necessary protection against abrasion, water, as well as other injurious conditions, while at the same time being readily removed when desired.

As will be evident to those skilled in the art, various modifications on this invention can be made or followed, in the light of the foregoing disclosure and discussion, without departing from the spirit or scope of the disclosure or from the scope of the following claims.

We claim:
1. A composition useful for coating various materials to protect said materials from injury, weather or abrasion and which coating is then readily stripped from the surface without injury to the surface which comprises a solution having from 5 to 50 weight percent of a predominantly atactic copolymer of ethylene and propylene, wherein said propylene is present in from 70 to 80 mole percent and of a molecular weight of at least 100,000, and a volatile solvent boiling in the range of about 50° to 150° C.

2. A composition according to claim 1 wherein said molecular weight of said copolymer is in the range of 100,000 to 2,000,000, and there is present from 0.1 to 10 weight percent based on said copolymer of additives as fillers and for oxidative protection and from 1 to 30 weight percent based on said copolymer of a hydrocarbon oil plasticizer.

3. A composition according to claim 2, wherein said molecular weight of said copolymer is in the range of 250,000 to 1,000,000 and at least one of said additives is carbon black or a benzotriazole.

4. A composition according to claim 2, wherein said volatile solvent is an aliphatic hydrocarbon solvent.

5. A composition according to claim 2, wherein said propylene is present in about 75 mole percent.

6. An article comprising a base material and a protective strippable film coating of from 0.001" to 0.05" thickness of a predominantly atactic copolymer of ethylene and propylene having from 70 to 80 mole percent propylene and being of at least 100,000 molecular weight.

7. An article according to claim 6, wherein said copolymer is of from about 250,000 to 1,000,000 molecular weight, has from 0.1 to 10 weight percent based on said copolymer of additives as fillers and for oxidative protection and from 1 to 30 weight percent based on said copolymer of a hydrocarbon oil plasticizer.

8. An article according to claim 7, wherein at least one of said additives is carbon black or a benzotriazole.

9. A method of protecting a surface subject to injury from weather or abrasion and then being able to remove the protecting film withous injury to the surface, which comprises applying to said surface a coating having an ultimate thickness of from 0.001" to about 0.25" of a composition according to claim 1.

10. A mehtod according to claim 9, wherein said composition is according to claim 2.

References Cited
UNITED STATES PATENTS
3,010,899  11/1961  Boyer.
3,051,585  8/1962  Weinberg et al. _____ 117—6 X FOREIGN PATENTS
997,774   7/1965   Great Britain.
1,014,075 12/1965  Great Britain.

MORRIS LIEBMAN, Primary Examiner.

U.S. Cl. X.R.
117—6; 260—41